US012789674B2

(12) United States Patent
Flick

(10) Patent No.: US 12,789,674 B2
(45) Date of Patent: Nov. 10, 2026

(54) DEVICE FOR LONGITUDINALLY ADJUSTING A SEAT, AND SEAT

(71) Applicant: Adient US LLC, Plymouth, MI (US)

(72) Inventor: Joachim Flick, Hückeswagen (DE)

(73) Assignee: Adient US LLC, Plymouth, MI (US)

( * ) Notice: Subject to any disclaimer, the term of this patent is extended or adjusted under 35 U.S.C. 154(b) by 15 days.

(21) Appl. No.: 18/576,821

(22) PCT Filed: Jul. 4, 2022

(86) PCT No.: PCT/IB2022/056178
§ 371 (c)(1),
(2) Date: Jan. 5, 2024

(87) PCT Pub. No.: WO2023/281382
PCT Pub. Date: Jan. 12, 2023

(65) Prior Publication Data

US 2024/0308395 A1 Sep. 19, 2024

(30) Foreign Application Priority Data

Jul. 7, 2021 (DE) ..................... 10 2021 207 169.4
Dec. 10, 2021 (DE) ..................... 10 2021 214 147.1

(51) Int. Cl.
*B60N 2/08* (2006.01)

(52) U.S. Cl.
CPC ......... *B60N 2/0868* (2013.01); *B60N 2/0818* (2013.01); *B60N 2/0843* (2013.01); *B60N 2205/20* (2013.01)

(58) Field of Classification Search
CPC .............. B60N 2205/20; B60N 2/0812; B60N 2/0818; B60N 2/0831; B60N 2/0837;
(Continued)

(56) References Cited

U.S. PATENT DOCUMENTS 5,234,189 A * 8/1993 Myers .................... B60N 2/071
296/65.13
9,120,400 B2 * 9/2015 Ruthmann ........... B60N 2/0806
(Continued)

FOREIGN PATENT DOCUMENTS

DE 2713973 A1 10/1978
DE 4436221 C1 2/1996
(Continued)

OTHER PUBLICATIONS

European Patent Office, International Search Report and Written Opinion in Application No. PCT/ IB2022/056178, dated Aug. 19, 2022, 14 pages, Rijswijk, Netherlands.
German Patent and Trademark Office, Office Action in Application No. DE 10 2021 214 147.1 dated Apr. 20, 2022, 7 pages.
(Continued)

*Primary Examiner* — Jonathan Liu
*Assistant Examiner* — Guang H Guan
(74) *Attorney, Agent, or Firm* — Marshall & Melhorn LLC

(57) ABSTRACT

A device for longitudinally adjusting a seat may have one pair of rails and at least one locking element. The one pair of rails formed by a top rail and a bottom rail which can be moved relative to one another. The at least one locking element being movably mounted on the top rail and blocking a movement of the top rail in the bottom rail in a locking position and releasing the movement of the top rail in the bottom rail in an unlocking position. The at least one locking element having a number of projections which are designed in such a way that, in the locking position, as viewed in the longitudinal direction of the at least one locking element, a front projection of the number of projections contacts the bottom rail and a rear projection of the number of projections contacts the top rail.

13 Claims, 9 Drawing Sheets

(58) Field of Classification Search
CPC .... B60N 2/0843; B60N 2/085; B60N 2/0856; B60N 2/0868; B60N 2/0875
See application file for complete search history.

(56) References Cited

U.S. PATENT DOCUMENTS

| | | | | |
|---|---|---|---|---|
| 10,195,963 | B2 * | 2/2019 | Flick | B60N 2/0715 |
| 11,358,498 | B2 * | 6/2022 | Speck | B60N 2/0843 |
| 12,515,566 | B2 * | 1/2026 | Sprenger | B60N 2/0837 |
| 2013/0153735 | A1 | 6/2013 | Ruthman et al. | |
| 2020/0276919 | A1 | 9/2020 | Kumagai et al. | |
| 2024/0286530 | A1 * | 8/2024 | Sprenger | B60N 2/0837 |
| 2024/0308395 | A1 * | 9/2024 | Flick | B60N 2/0868 |
| 2025/0196728 | A1 * | 6/2025 | Quast | B60N 2/0705 |
| 2025/0196729 | A1 * | 6/2025 | Quast | B60N 2/0705 |

FOREIGN PATENT DOCUMENTS

| | | | |
|---|---|---|---|
| DE | 19824038 | C1 | 7/1999 |
| DE | 102008004124 | A1 | 7/2009 |
| DE | 102014214184 | A1 | 11/2015 |
| DE | 102014219860 | A1 | 3/2016 |
| DE | 102014225426 | A1 | 4/2016 |
| DE | 102011012077 | B4 | 1/2018 |
| EP | 1227950 | A1 | 8/2002 |
| FR | 2886588 | A1 | 12/2006 |
| FR | 2908698 | A1 | 5/2008 |
| WO | 2021193608 | A1 | 9/2021 |

OTHER PUBLICATIONS

German Patent and Trademark Office, Office Action in Application No. DE 10 2021 214 147.1 dated Nov. 22, 2023, 6 pages.

* cited by examiner

DEVICE FOR LONGITUDINALLY ADJUSTING A SEAT, AND SEAT

FIELD

The invention relates to a seat longitudinal-adjustment device for a seat, and to a seat, in particular a vehicle seat, having such a seat longitudinal-adjustment device.

A seat longitudinal-adjustment device generally comprises two mutually spaced pairs of rails which are each constructed from two rails: an upper rail, assigned to the seat, and a lower rail, assigned to the floor of a vehicle. The seat longitudinal-adjustment device furthermore comprises at least one spring-loaded, movable, planar locking part which is held on the upper rail and which, in a locking position, blocks a movement of the upper rail in the lower rail. Here, the lower rail may have apertures whilst the upper rail is provided with openings, and the locking part, at its two opposite longitudinal sides, bears projections which, in the locking position, are movable both into the openings and into the apertures by means of a spring. Such a seat longitudinal-adjustment device is known for example from the European patent EP 1 227 950 B1.

BACKGROUND

It is an object of the present invention to specify an improved seat longitudinal-adjustment device and a seat having an improved seat longitudinal-adjustment device.

With regard to the seat longitudinal-adjustment device, and with regard to the seat, the object is achieved according to the invention by means of the features of the claims as discussed herein.

The dependent claims relate to advantageous refinements.

SUMMARY

The object is achieved according to the invention by means of a seat longitudinal-adjustment device that comprises at least a pair of rails and at least one locking element, wherein the pair of rails is formed from an upper rail and a lower rail that are movable relative to one another, and wherein the at least one locking element is arranged movably on the upper rail and, in a locking position, blocks a movement of the upper rail in the lower rail and, in an unlocking position, allows a movement, and wherein the locking element has a number of projections that are designed such that, as viewed in a longitudinal direction of the locking element, in the locking position, a front projection makes contact with the lower rail and a rear projection makes contact with the upper rail, or vice versa.

The advantages achieved by means of the invention consist in particular in that, by means of such a locking element, which is in particular preloaded, for example spring-loaded, and which has a projection that makes contact with the upper rail in the locking position and a projection that makes contact with the lower rail in the locking position, play between the lower rail (also referred to as guide rail) and the upper rail (also referred to as rail runner) can be particularly easily eliminated. Furthermore, a simple bracing and arresting function for the locking element is realized, without additional components, through the utilization of a combined movement consisting of a rotational movement and a pulling movement. For example, the locking element is held in a preloaded state by means of a spring element. An arresting function for the locking element in the locking position, for the purposes of holding the locking element in its locking position and thus blocking the pair of rails, is made possible by a blocking element. By way of a combined rotational movement and pulling movement of the locking element during the unlocking thereof, said arresting function, and thus the blockage of the locking element by the blocking element, is circumvented, such that the pair of rails is unblocked and the upper rail is movable, in particular adjustable, relative to the lower rail.

For example, only the front, in particular the foremost, projection and the rear, in particular the rearmost, projection each have at least one conical region. Preferably, at least one or more intermediate projections arranged between said front projection and said rear projection have a straight form or a rectangular form and are configured so as not to make contact with the upper rail or with the lower rail.

For example, the locking element may be braced in the locking position such that a conical region of the front projection is pressed against the lower rail and a conical region of the rear projection is pressed against the upper rail, or vice versa, such that play between the lower rail and the upper rail is eliminated in the locking position. This allows particularly quiet locking of the seat longitudinal-adjustment device. Furthermore, no additional components are required for eliminating play. In particular, the locking element is designed, and engages into the upper rail and the lower rail, such that play between the upper rail and the lower rail is eliminated in the locking position by means of the preloaded, in particular spring-loaded, locking element.

In particular, the front projection and the rear projection may be of conical form such that, when mechanical load is applied to the seat longitudinal-adjustment device, in particular in a longitudinal direction thereof, the front projection engages with clamping or self-locking and load-bearing action into the lower rail and the rear projection engages with clamping or self-locking and load-bearing action into the upper rail, or vice versa. In particular, the conical regions, for example wedge-shaped regions, of the front projection and of the rear projection press against rail recesses, such as apertures and/or openings in the upper rail and in the lower rail, in order to generate a clamping force or constraining force and bear load, in particular transfer load to the upper rail and the lower rail. In particular, the conical region has a corresponding wedge angle. To realize a clamping force, a correspondingly large wedge angle, also referred to as clamping angle, is provided in each conical region. To realize a self-locking action, a wedge angle, also referred to as friction angle, is provided which is great enough to prevent a movement or rotation of the particular projection relative to the particular rail, and which is in particular less than the clamping angle.

Furthermore, the intermediate projections may be designed such that, when mechanical load is applied to the seat longitudinal-adjustment device, in particular in a longitudinal direction, said intermediate projections engage only with load-bearing action into the lower rail and/or into the upper rail. By means of such a design of the intermediate projections, these can bear higher loads, in particular longitudinal loads, for example crash loads in a longitudinal direction.

Furthermore, the front projection and the rear projection and the intermediate projections may be designed such that, when mechanical load is applied to the seat longitudinal-adjustment device, firstly the front projection engages with clamping or self-locking and load-bearing action into the lower rail and the rear projection engages with clamping or self-locking and load-bearing action into the upper rail, or vice versa, and if further mechanical load is applied, the intermediate projections additionally engage with load-bearing action into the upper rail and/or into the lower rail. Staged bearing of load and dissipation of load are thus made easily possible when mechanical load is applied.

The locking element is designed as a horizontal locking means, and locks the upper rail and lower rail with respect to one another, whilst eliminating play, in a straightforward manner. In other words: The upper rail and lower rail are preloaded with respect to one another by means of the, in particular spring-loaded, locking element in the locking position. For example, the locking element is in the form of a locking plate, from which multiple projections, in particular teeth, protrude laterally at least at one of the sides, in particular at a longitudinal side. The locking element may furthermore be designed as a double locking means.

One refinement provides a single region of contact of the locking element with the upper rail and a single region of contact of the locking element with the lower rail when the locking element is in the locking position.

For example, the single region of contact with the upper rail, in particular as viewed in a longitudinal direction, takes the form of contact between the rear projection and the upper rail or contact between the front projection and the upper rail. The single region of contact with the lower rail, in particular as viewed in a longitudinal direction, is formed for example between the rear projection and the lower rail or between the front projection and the lower rail. Preferably, the front projection makes contact with the upper rail when the rear projection makes contact with the lower rail. Alternatively, the rear projection makes contact with the upper rail when the front projection makes contact with the lower rail.

Additionally, the locking element is also guided in a vertical direction in detent openings or detent apertures in the upper rail and/or in the lower rail.

For example, the locking element has multiple projections, wherein only one of the projections, in particular a foremost projection as viewed in a longitudinal direction, makes contact with the lower rail and only one of the other projections, in particular a rearmost projection as viewed in a longitudinal direction, makes contact with the upper rail, or vice versa. Here, in the locking position, the remaining projections between the foremost projection and the rearmost projection are arranged so as not to be in contact with the upper rail or with the lower rail. In other words: Only a single one of the projections of the locking element makes contact with or lies against the upper rail in the locking position, and only a single one of the projections of the locking element makes contact with or lies against the lower rail in the locking position.

In particular, the front projection as viewed in a longitudinal direction or the rear projection of the locking element makes contact with the upper rail. For example, one side of the front projection or of the rear projection lies against one side of an associated opening or passage opening in the upper rail. Furthermore, the rear projection as viewed in a longitudinal direction or the front projection of the locking element makes contact with the lower rail. For example, one side of the rear projection or of the front projection lies against one side of an associated aperture or passage opening in the lower rail.

A further embodiment provides for the front projection and/or the rear projection of the locking element to be of conical design. In particular, that front projection and/or that rear projection which makes contact with, in particular partially lies against, the upper rail and/or the lower rail in a region of contact is of conical design.

In one possible embodiment, the front projection, in particular a front tooth, has a conical region in the region of contact with the lower rail (also referred to as guide rail or guide profile). The rear projection, in particular a rear tooth, has a conical region in the region of contact with the upper rail (also referred to as rail runner). The front projection may be the foremost projection. The rear projection may be the rearmost projection. The remaining projections, in particular those between the front projection and the rear projection, do not make contact in the locking position. That is to say, these remaining projections make contact neither with the upper rail nor with the lower rail. This allows a comfortable unlocking movement and unlocking force, because only the frictional force or contact force of the front and rear projections has to be overcome during the unlocking operation. The remaining projections are furthermore designed so as to make contact with the upper rail and with the lower rail only in the presence of relatively high longitudinal loads, in particular in the presence of a collision load, for example in the event of a rear-end collision.

In particular, the locking element is spring-loaded and arranged movably on the upper rail of the pair of rails. For example, the locking element is arranged and configured such that, during an unlocking operation, said locking element is firstly partially rotatable, in the locking position, into an intermediate position, and is subsequently adjustable, in particular movable in a linear or arcuate movement, or can be pulled out, from the intermediate position into an unlocking position.

For example, in the locking position, the locking element is held or arranged force-fittingly, in particular frictionally, in a transverse direction, and is movable to a limited extent in a vertical direction. In particular, the locking element blocks the upper rail and lower rail in a longitudinal direction.

To eliminate the blocking of the upper rail and lower rail, the locking element is adjustable from the locking position into the unlocking position by means of a combined rotating and pulling movement. For example, in the locking position, the locking element is firstly movable, by rotation, out of the force-fitting bracket, and, by means of a pulling movement, in particular a linear or arcuate movement, is movable, in particular can be pulled out, into the unlocking position.

One refinement provides an actuating element for the locking element, wherein the actuating element is arranged in an interior space formed between the upper rail and the lower rail. In particular, the actuating element is arranged within the upper rail. Such an arrangement of the actuating element within a particular pair of rails allows a particularly compact arrangement.

For example, the upper rail has a passage opening through which the actuating element is actuatable.

The invention furthermore relates to a seat, in particular a vehicle seat, having the above-described seat longitudinal-adjustment device. The seat longitudinal-adjustment device comprises, in particular, two mutually spaced pairs of rails, wherein each pair of rails has a locking element. Each pair of rails is formed from an upper rail and a lower rail that are movable relative to one another.

DESCRIPTION OF THE FIGURES

Exemplary embodiments of the invention will be discussed in more detail on the basis of drawings. In the drawings.

DETAILED DESCRIPTION

Mutually corresponding parts are denoted by the same reference designations throughout the figures.

Figure 1:
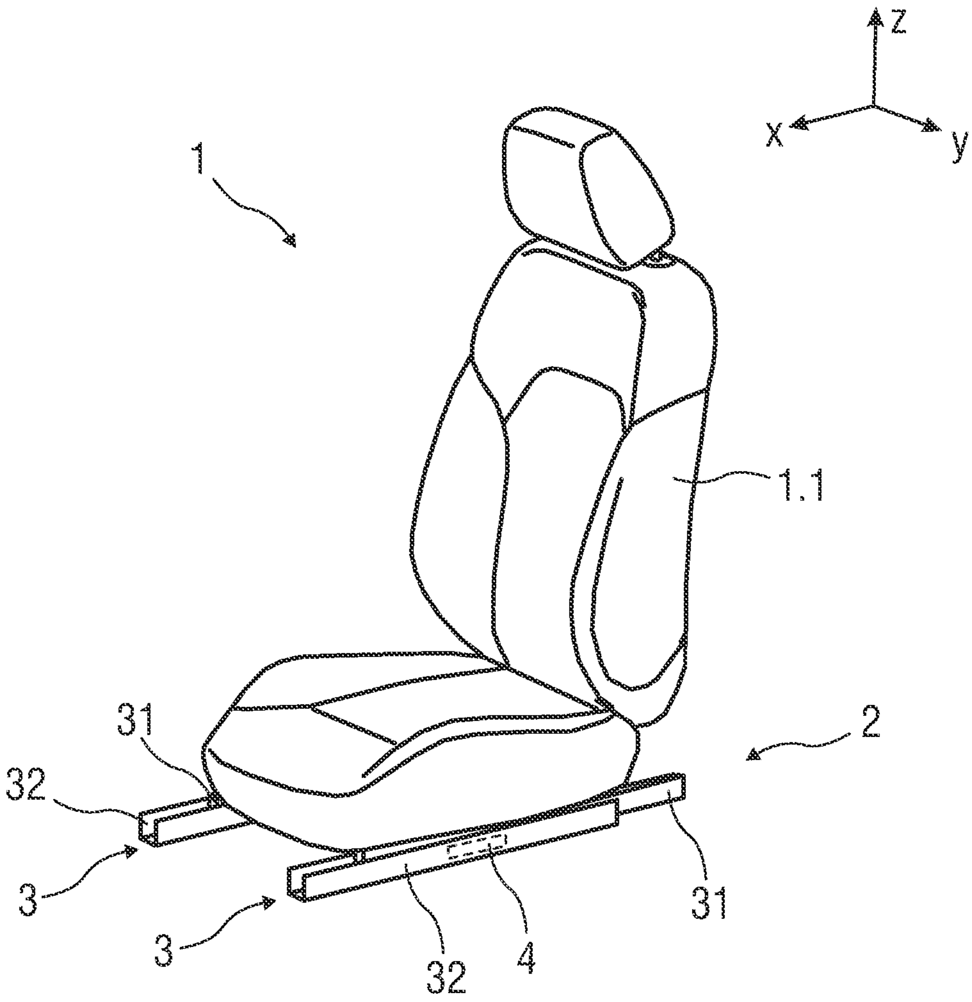
FIG. 1 is a schematic perspective illustration of a seat, in particular a vehicle seat, having a seat longitudinal-adjustment device comprising two pairs of rails.

FIG. 1 is a schematic perspective illustration of a seat 1, in particular a vehicle seat, having a seat longitudinal-adjustment device 2. By means of the seat longitudinal-adjustment device 2, the seat 1 is arranged for example on a vehicle body (not illustrated in any more detail).

The seat 1 that is schematically illustrated in FIG. 1 will hereinafter be described on the basis of three mutually perpendicular spatial directions. In the case of a seat 1 that has been installed in the vehicle, a longitudinal direction x runs substantially horizontally and preferably parallel to a vehicle longitudinal direction that corresponds to the normal direction of travel of the vehicle. A transverse direction y, which runs perpendicular to the longitudinal direction x, is likewise oriented horizontally in the vehicle, and runs parallel to a vehicle transverse direction. A vertical direction z runs perpendicular to the longitudinal direction x and perpendicular to the transverse direction y. In the case of a seat 1 that has been installed in the vehicle, the vertical direction z runs preferably parallel to a vehicle vertical axis.

The position terminology and directional terminology used, such as front, rear, top and bottom, relate to a viewing direction of an occupant seated in a normal sitting position on the seat 1, with the seat 1 having been installed in the vehicle in a usage position suitable for conveying passengers, having an upright backrest 1.1, and being oriented in a direction of travel in the conventional manner. The seat 1 can however also be installed in, or moved into, some other orientation, for example opposite to the direction of travel.

The seat longitudinal-adjustment device 2 comprises, for example, two pairs of rails 3 that are mutually spaced. Each pair of rails 3 comprises an upper rail 31, also referred to as rail runner or seat rail, and a lower rail 32, also referred to as guide rail or floor rail. The upper rail 31 is arranged on the lower rail 32 so as to be longitudinally adjustable between a front end position and a rear end position. This adjustability allows the position of the seat 1 to be adjusted longitudinally, with the front end position of the upper rail 31 being assigned to the foremost position of the seat 1, and the rear end position of the upper rail 31 being assigned to the rearmost position of the seat 1.

The seat longitudinal-adjustment device 2 furthermore comprises at least one locking element 4. Here, each pair of rails 3 may comprise an associated locking element 4, as will be described in more detail below on the basis of FIGS. 2 to 6.

Figure 2:
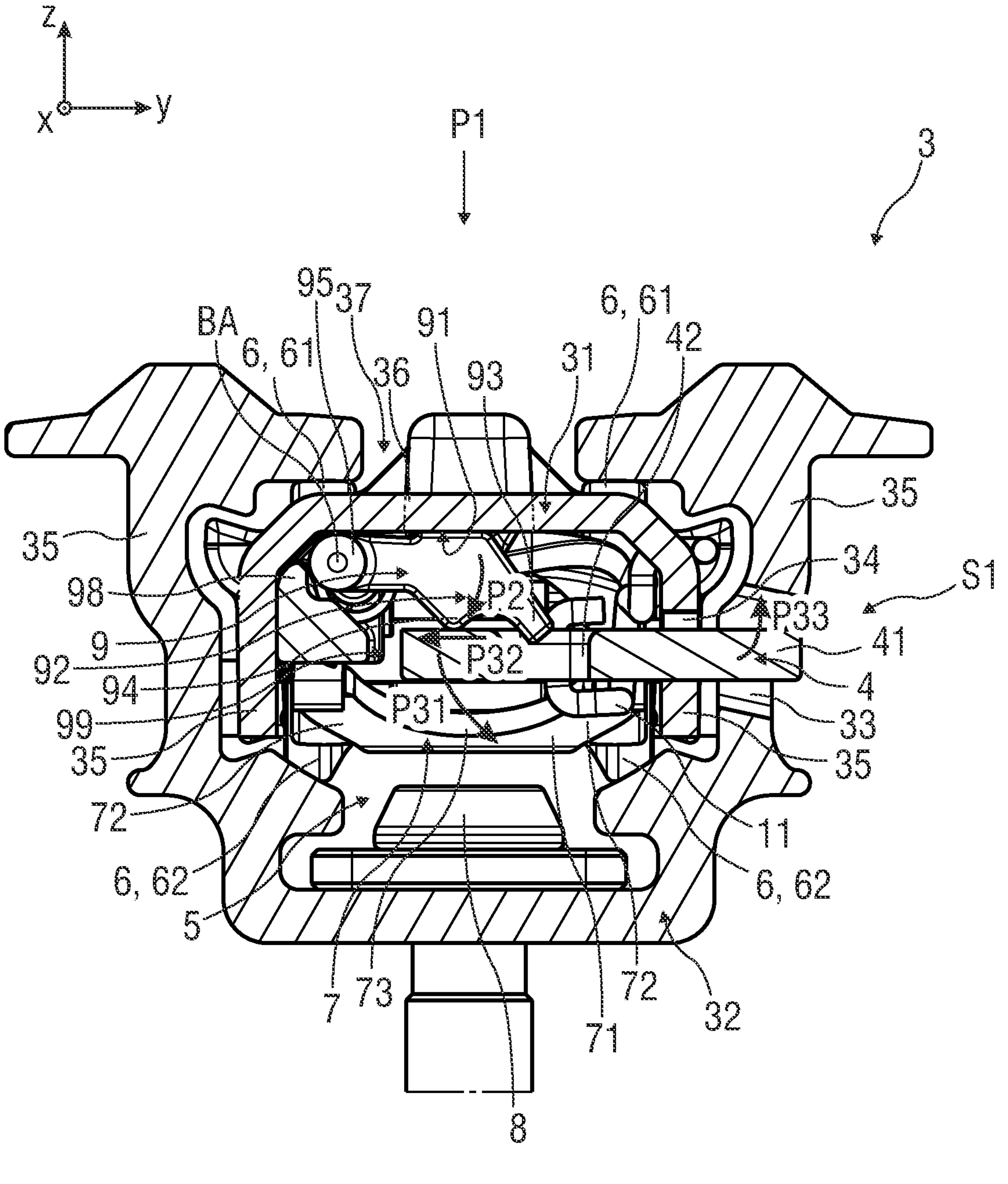
FIG. 2 is a schematic sectional illustration through a pair of rails in the region of an engagement opening for actuating a locking element, which is arranged in a locking position.

FIG. 2 is a schematic sectional illustration through one of the pairs of rails 3 in the region of the associated locking element 4.

Figure 3:
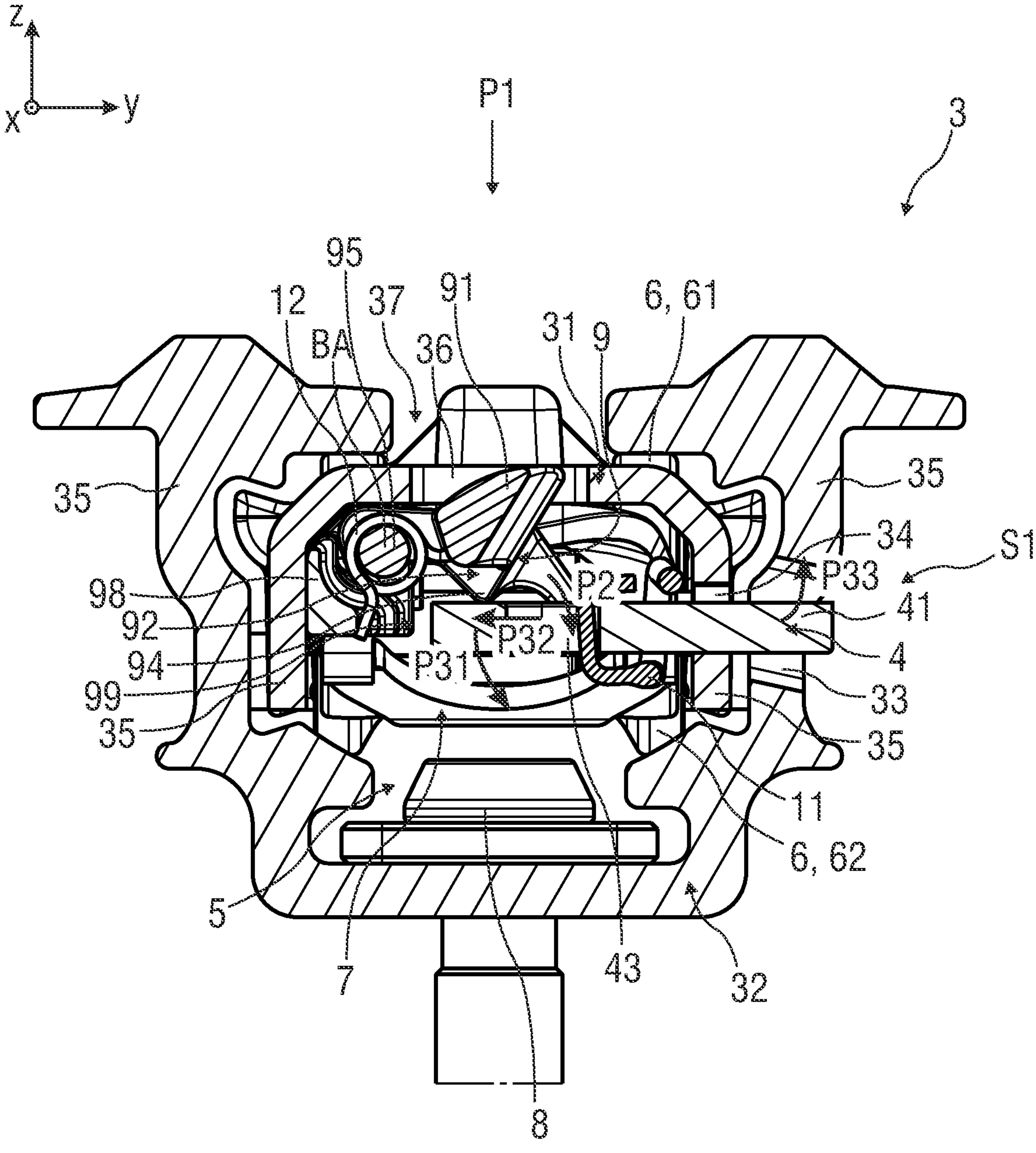
FIG. 3 is a schematic sectional illustration through the pair of rails in the region of a bracket of a restoring element for the locking element.

FIG. 3 is a schematic sectional illustration through a further alternative pair of rails 3 in the region of the associated locking element 4. The two pairs of rails 3 are of substantially identical construction.

The at least one locking element 4, or each locking element 4, is designed as a double locking means.

The at least one locking element 4 is held or arranged in spring-loaded and movable fashion, in particular is mounted rotatably and movably, in particular so as to be adjustable or movable in an arcuate movement by means of a combined rotational movement and pulling movement, on the upper rail 31. The locking element 4 is for example guided in the detent holes or openings 34 in the upper rail 31, in particular during a pivoting movement of the locking element 4 in the locking position S1. During an unlocking movement from the locking position S1 into the unlocking position S2, the locking element 4 is unlocked by the actuating element 9 in a manner controlled by way of the combined rotating and pulling movement. The locking element 4 has no defined axis of rotation.

Figure 5:
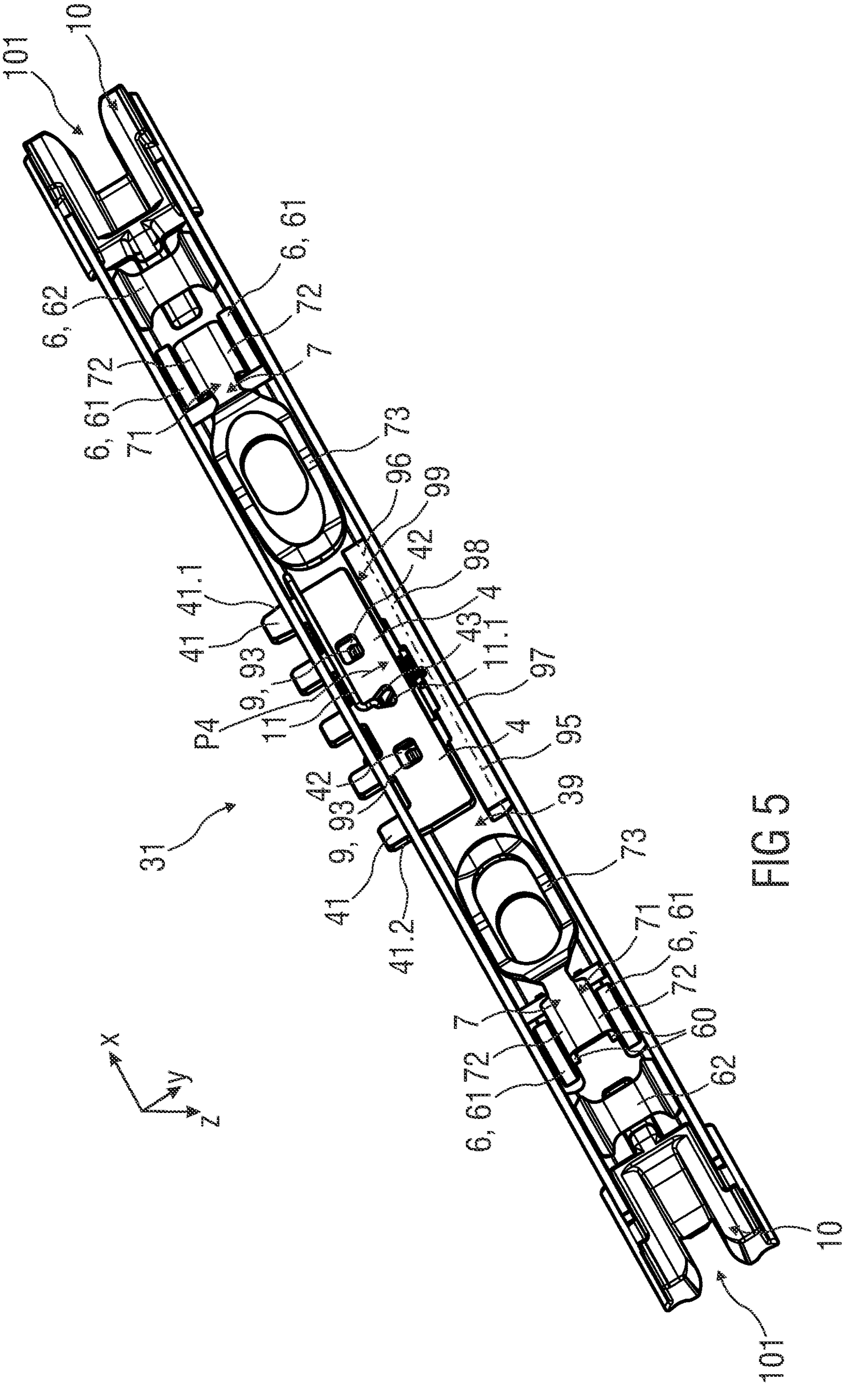
FIG. 5 is a schematic perspective illustration of a bottom side of the upper rail.
Figure 6:
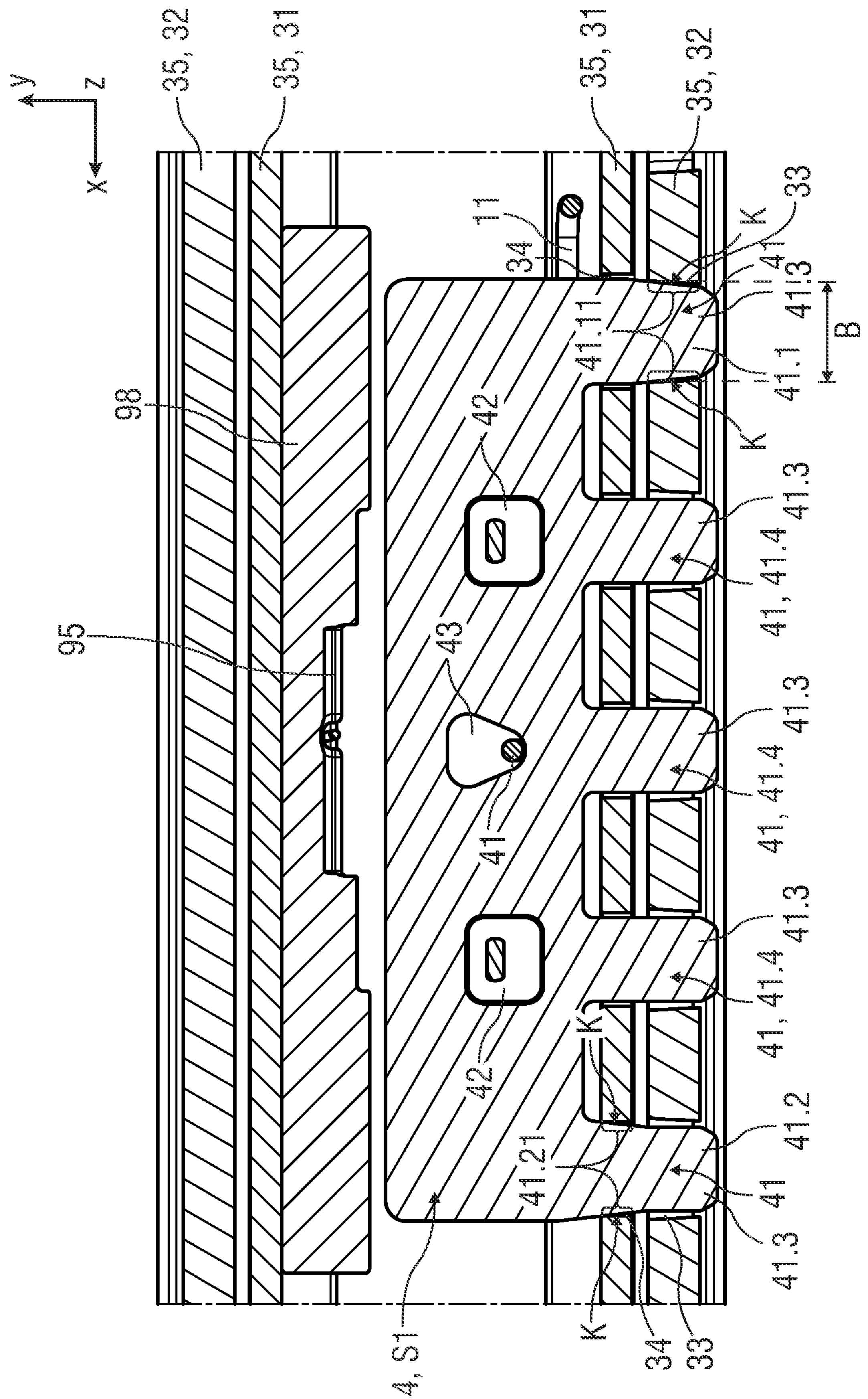
FIG. 6 shows a schematic enlarged detail of FIG. 5 in the region of the locking element.
Figure 7:
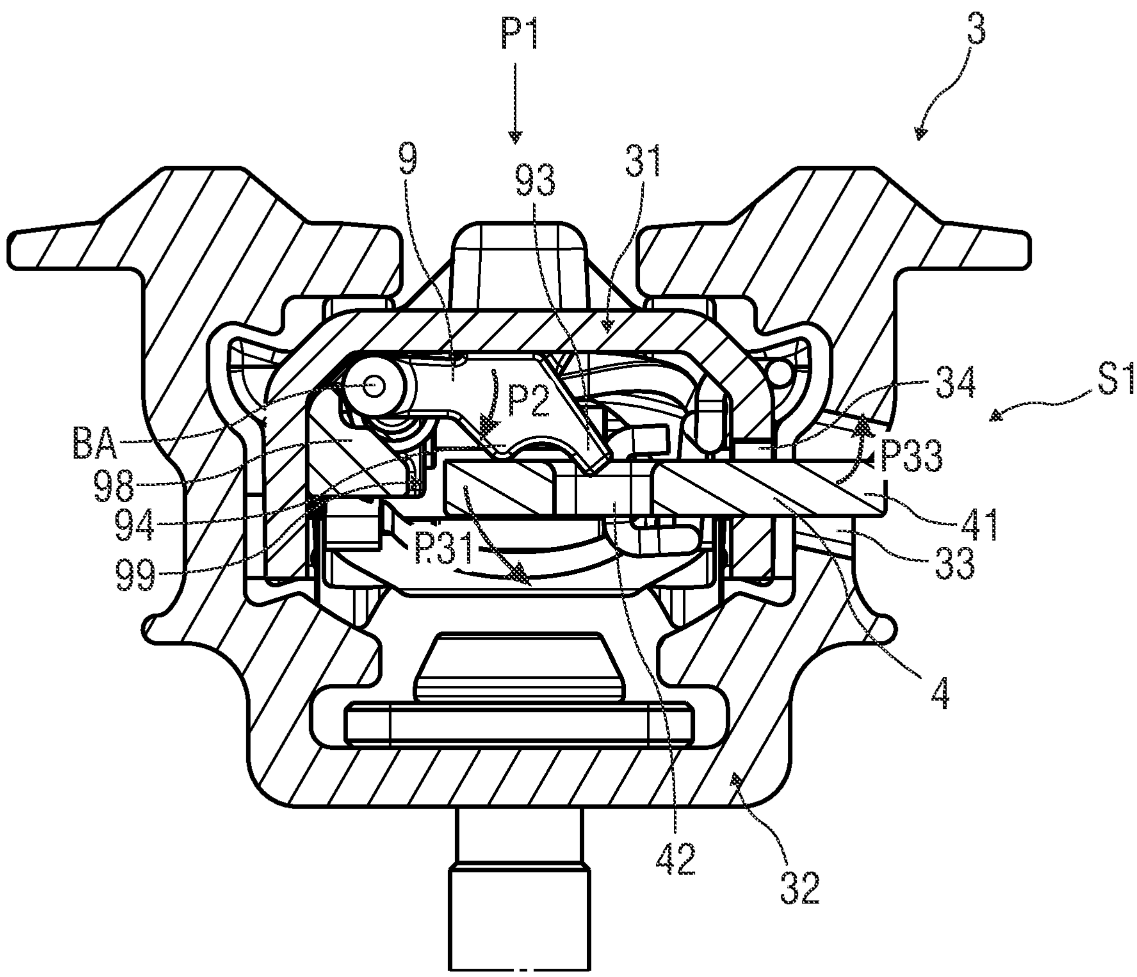
FIG. 7 is a schematic sectional illustration of part of a sequence of an unlocking operation of the locking element, with the locking element arranged in the locking position.

Also provided is a restoring element 11, in particular a restoring spring, which is shown in FIGS. 2 to 9. The restoring element 11 is held at one end on the upper rail 31 and is held at the other end on the locking element 4. In a locking position S1 as illustrated in FIGS. 2, 3 and 7, the locking element 4 blocks a movement of the upper rail 31 in the lower rail 32. The restoring element 11 is braced during the unlocking operation. When the unlocking force is withdrawn, the restoring element 11 relaxes, such that the locking element 4 is automatically returned into the locking position S1 by means of the restoring element 11. Here, the restoring element 11, in particular the spring force thereof, is configured such that said restoring element forces the locking element 4 into the locking position S1. In other words: The locking element 4 is adjusted, in particular forced, in spring-loaded fashion into the locking position S1, such that the upper rail 31 and the lower rail 32 are arranged without play with respect to one another.

In particular, the locking element 4 is arranged and configured such that, during an unlocking operation, said locking element is firstly partially rotatable, in the locking position S1, into an intermediate position S3 (illustrated in FIG. 8), and is subsequently adjustable, in particular movable in a linear or arcuate movement, or can be pulled out, from the intermediate position S3 into an unlocking position S2 (illustrated in FIG. 9).

For example, in the locking position S1, the locking element 4 is held force-fittingly, in particular frictionally, in a transverse direction y, and is movable to a limited extent in a vertical direction z. In particular, the locking element 4 blocks the upper rail 31 and lower rail 32 in a longitudinal direction x.

To eliminate the blocking of the upper rail 31 and lower rail 32, the particular locking element 4 according to FIG. 2 or 3 is firstly movable, in the locking position S1, out of the force-fitting bracket, in particular into the intermediate position S3 (illustrated in FIG. 8), by way of the rotation about an axis of rotation in a longitudinal direction x, and is movable, in particular can be pulled out, from the intermediate position S3 into the unlocking position S2 by way the linear or arcuate movement.

Figure 8:
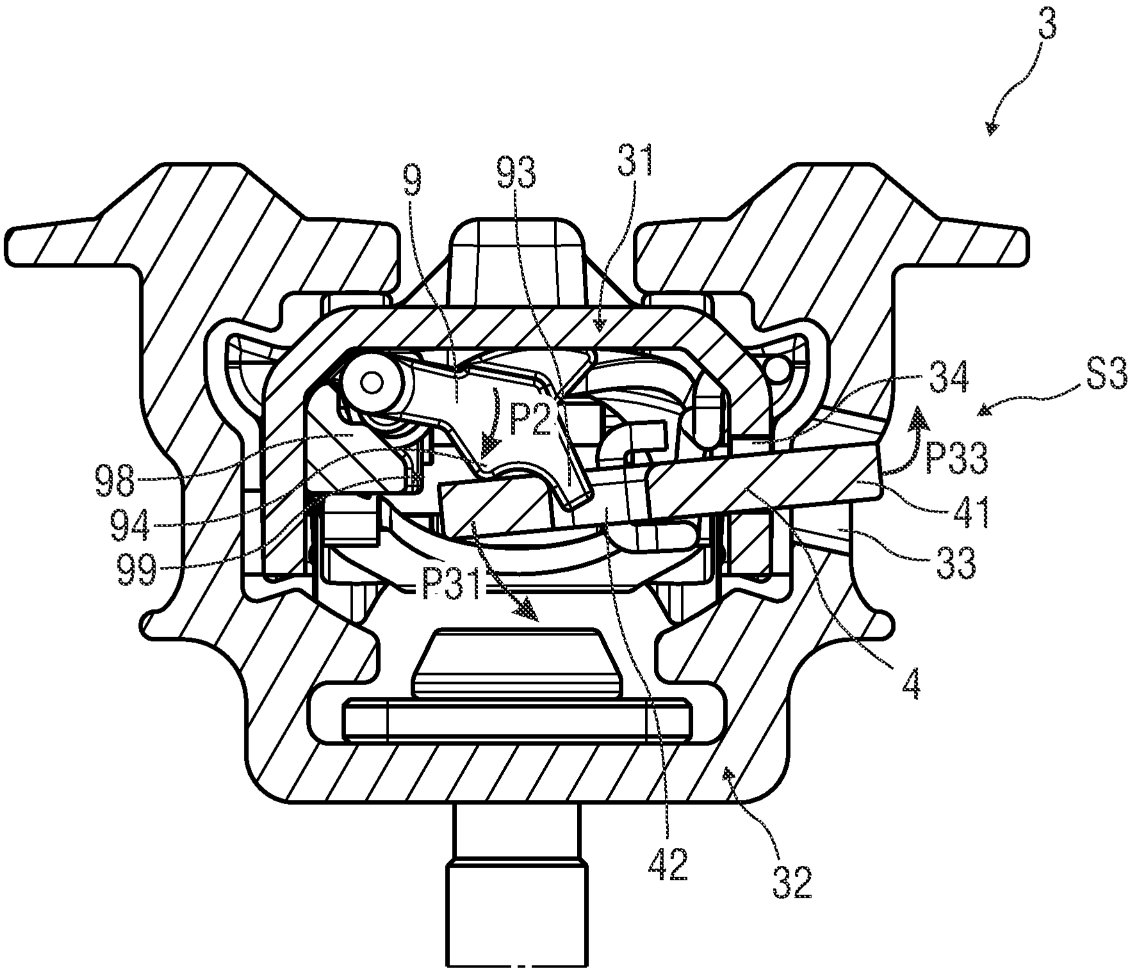
FIG. 8 is a schematic sectional illustration of a subsequent part of the sequence of the unlocking operation of the locking element following FIG. 7, with the locking element having been adjusted into an intermediate position, and, FIG. 9 is a schematic sectional illustration of a subsequent part of the sequence of the unlocking operation of the locking element following FIG. 8, with the locking element having been adjusted into an unlocking position.
Figure 9:
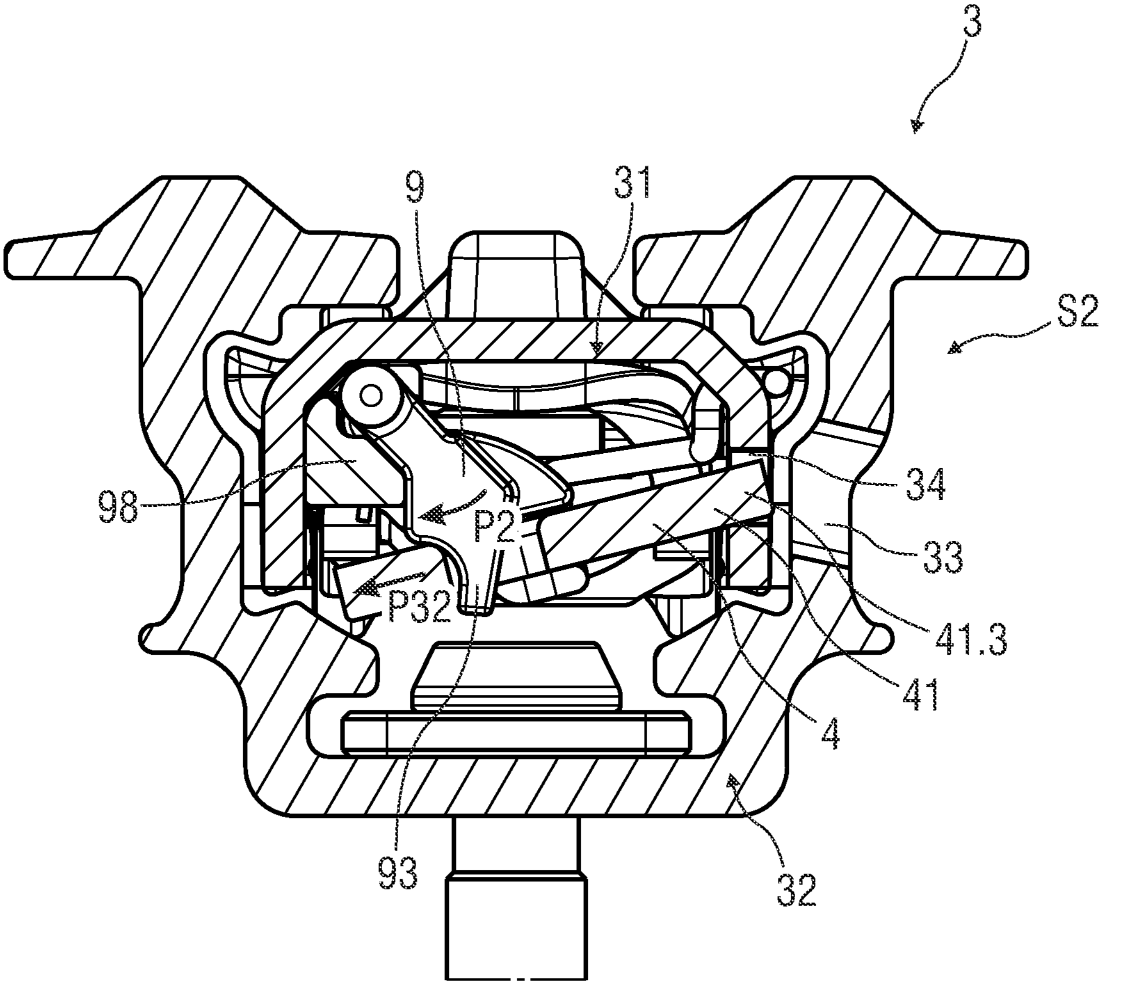

In the unlocking position S2 illustrated in FIG. 9, the locking element 4 allows a movement of the upper rail 31 relative to the lower rail 32. Here, the locking element 4 is arranged and configured such that, during an unlocking operation, said locking element is firstly partially rotatable in the locking position S1 and is subsequently adjustable, in particular can be pulled out, into the unlocking position S2 (also referred to as release position). The sequence of movements during the unlocking operation will be described in detail below on the basis of FIGS. 7 to 9.

The seat longitudinal-adjustment device 2 additionally comprises a stop element or blocking element 98 (illustrated in FIGS. 2, 3 and 5 to 9), which at least limits or blocks undesired movements of the locking element 4 out of the locking position S1. The blocking element 98 is designed for example as a profiled body that extends along the longitudinal direction x. The blocking element 98 is arranged within the upper rail 31 and is fastened, in particular welded, thereto. The blocking element 98 may additionally be designed as a bearing for the actuating element 9.

The blocking element 98 is arranged, within the upper rail 31, parallel to the locking element 4. The blocking element 98 extends in a longitudinal direction x at least over the entire length of the locking element 4. The blocking element 98 may have a greater length than the locking element 4. Along the side directed toward the locking element 4, the blocking element 98 has a correspondingly shaped stop surface 99. Dynamic disengagement of the locking element 4 is thus prevented. An arresting function for the locking element 4 in its locking position S1 is made possible by means of the blocking element 98.

By way of the combined rotational movement and pulling movement of the locking element 4 during the unlocking thereof, said arresting function, and thus the blockage of the locking element 4 by the blocking element 98, is circumvented, such that the pair of rails 3 is unblocked and the upper rail 31 is movable, in particular adjustable, relative to the lower rail 32.

The locking element 4 is designed as a horizontal locking means in a longitudinal direction x. The locking element 4 imparts a locking action only in a longitudinal direction x. Vertically, the upper rail 31, also referred to as rail runner, is guided by means of the rollers 61. Furthermore, the locking element 4 is held frictionally at least on one of the rails 31, 32, in particular the upper rail 31. For example, the locking element 4 is designed as a locking plate. By means of the spring-loaded locking element 4, play between the lower rail 32 and upper rail 31 is eliminated in a straightforward manner. Dynamic disengagement of the locking element 4 out of its locking position S1 is prevented by means of the blocking element 98 (also referred to as horizontal stop).

FIG. 2 is a detailed schematic sectional illustration through the pair of rails 3 in the region of an engagement opening 42 for actuating the locking element 4, which is arranged in the locking position S1.

To block the movement of the upper rail 31 relative to the lower rail 32 in order to prevent a movement of the seat, the lower rail 32 is equipped with a number of apertures 33 and the upper rail 31 is equipped with a number of openings 34 (illustrated in FIGS. 2 to 9). In the locking position S1, projections 41, in particular tooth-like projections 41, of the locking element 4 engage into said apertures 33, in particular slot-like passage openings, and openings 34, in particular slot-like or comb-shaped openings, such that a movement between the upper rail 31 and lower rail 32 is blocked. In particular, in the locking position S1, the projections 41 of the locking element 4 are frictionally held and fixed at least on one of the rails 31, 32, in particular in the apertures 33 in the upper rail 31.

The upper rail 31 is formed from a sheet-metal profile that has been bent into a U shape. The lower rail 32 is formed for example from a pressed aluminum profile. For example, the upper rail 31 may be formed as a bent steel profile with shaped steel parts attached by welding, for example with the blocking element 98 attached by welding. Here, the profiles may be configured such that the free ends 35, in cross section, both of the upper rail 31 and of the lower rail 32 engage into one another, whereby the upper rail 31 is substantially fixed in a vertical direction z (z-axis direction).

When the upper rail 31 has been installed on the lower rail 32, these delimit a cavity 5 in the interior of the seat longitudinal-adjustment device 2.

The seat 1 is adjusted longitudinally relative to the vehicle floor by way of a longitudinal movement of the upper rail 31 relative to the lower rail 32. Here, the upper rail 31 and the lower rail 32 are in contact with one another, only in particular guide regions, via roller elements 6. During a longitudinal adjustment of the seat during normal operation, the upper rail 31 (also referred to as rail runner) is fixed in resiliently preloaded fashion in a vertical direction z (z-axis direction), and is movable in a longitudinal direction x (x-axis direction), relative to the lower rail 32 by means of at least one or more of said roller elements 6. In the remaining region, the lower rail 32 and the upper rail 31 are mutually spaced in spring-preloaded fashion, and thus without play, owing to the mounting by means of the roller elements 6.

For the spring preloading of the upper rail 31 with respect to the lower rail 32 via the at least one roller element 6, a preload element 7 is provided, which is arranged within the upper rail 31.

The preload element 7 is arranged in the cavity 5. The preload element 7 makes it possible for play between the lower rail 32 and the upper rail 31 to be easily eliminated even during a longitudinal adjustment of the seat 1. Here, the movable upper rail 31 is moved in spring-preloaded fashion in the lower rail 32.

For this purpose, the preload element 7 is designed as a multifunctional component that is designed simultaneously as a carrier, as a spring and as a bearing for at least one or more of the roller elements 6. The preload element 7 is in particular a profile element, a sheet-metal shaped part or a sheet-metal punched part.

For example, the preload element 7 comprises a carrier region 71 that is formed from a sheet-metal carrier plate. The carrier region 71 is shaped, in particular bent, such that a bearing region 72 and a spring region 73 are formed. The spring region 73 may be designed for example as a leaf spring with a hole, for example in the form of a slot, situated therein. The spring region 73 may be multiply bent. The bearing region 72 is designed to receive a bearing pin for a first roller element 61, in particular two bearing journals 60 for two first roller elements 61 (as illustrated in FIG. 5). The one or more first roller elements 61 are designed for example as slide cylinders or slide rollers.

By means of the preload element 7, which is supported via the first roller elements 61 on the lower rail 32 and via the spring region 73 on the upper rail 31, the corresponding preload is generated in order to eliminate play between the rails 31, 32 of the particular pair of rails 3. In other words: The invention makes it possible to realize a movable upper rail 31 having at least one or more first roller elements 61 that are resiliently preloaded with respect to the lower rail 32 for the purposes of eliminating free play in the lower rail 32 or in the guide rail.

For example, the first roller elements 61 are rotatably mounted on the preload element 7 and are arranged in spring-preloaded fashion on the upper rail 31, in particular on the rail runner. Here, the spring region 73, which is supported on the upper rail 31 (rail runner), of the preload element 7 transmits the preload to the bearing region 72 and via the latter to the one or more first roller elements 61, which in the locking position S1 are/is arranged in resiliently preloaded fashion on the lower rail 32 via openings or recesses 381 in the upper rail 31, and/or which in the unlocking position S2 or release position roll(s) in resiliently preloaded fashion on a contact surface of the lower rail 32.

Furthermore, the seat longitudinal-adjustment device 2 for the longitudinal adjustment of the seat 1 comprises slide rollers or slide cylinders as at least one second roller element 62.

Depending on the arrangement of the preload element 7, the first roller elements 61 (as illustrated) or the second roller elements 62 (not illustrated) may be arranged in resiliently preloaded fashion on the upper rail 31 and roll resiliently on the lower rail 32. Thus, either the upper roller elements 61 are fixed, and the lower roller elements 62 are spring-mounted by means of the preload element 7, or vice versa.

For the fastening of the lower rail 32 to the vehicle body, for example a vehicle floor, a fastening bolt 8 is provided which is led through a passage opening in a floor portion of the lower rail 32 in order to be fastened to the vehicle body.

For the longitudinal adjustment of the seat 1, the seat longitudinal-adjustment device 2 furthermore has an actuating element 9.

The actuating element 9 is arranged in the cavity 5 (also referred to as interior space) formed between the upper rail 31 and the lower rail 32.

The upper rail 31 has a passage opening 36 (illustrated in FIG. 3) through which the actuating element 9 is actuatable.

In the exemplary embodiment, the actuating element 9 is designed as an actuating lever, in particular a rotary lever, which is rotatably mounted on the upper rail 31. For this purpose, the actuating element 9 comprises a rotary bearing 95 (illustrated for example in FIG. 2), which is arranged on the upper rail 31. The actuating element 9 furthermore comprises at least an actuating region 91 and a coupling region 92. The actuating region 91 is designed as an actuating arm or actuating projection.

In the embodiment according to FIG. 2, in the locking position S1, the actuating region 91 projects into the passage opening 36, such that the actuating region 91 is actuatable through the open leg region 37 of the U-shaped lower rail 32 for the purposes of unlocking the locking element 4.

Alternatively, the actuating region 91 may also project through the passage opening 36 and beyond the upper rail 31 and into the open leg region 37 of the U-shaped lower rail 32 (not illustrated in any more detail), such that the actuating region 91 is actuatable for the purposes of unlocking the locking element 4.

In the embodiment according to FIG. 3, the actuating region 91 of the actuating element 9 projects into the passage opening 36, and is actuatable from above through the open leg region 37 of the U-shaped lower rail 32 for the purposes of unlocking the locking element 4.

The coupling region 92 is designed correspondingly to the region of contact of the locking element 4. The coupling region 92 comprises at least a hook-shaped projection 93 and a control cam 94. For example, the locking element 4 comprises the engagement opening 42 into which the hook-shaped projection 93 of the coupling region 92 engages. The control cam 94 lies against a top side of the, in particular planar, locking element 4.

In order to unlock the locking element 4, the actuating element 9 is actuated, wherein the actuating region 91 is actuated toward and into, in particular is pushed as per arrow P1 into, the passage opening 36 (as illustrated for example in FIG. 7).

Here, the actuating element 9 is pivoted about an actuation axis BA as per arrow P2, such that the control cam 94, which is in engagement with the locking element 4, firstly tilts or rotates the planar locking element 4 downward as per arrow P31 (as is also illustrated in FIGS. 7 and 8). The in particular planar part of the locking element 4, said part being arranged in the cavity 5, is in particular rotated downward toward the lower rail 32, as per arrow P31. The actuation axis BA is identical to the axis 96.

As a result of the inner end of the locking element 4 rotating downward as per arrow P31, the projections 41 of the locking element 4, in the locking position S1, are rotated or pivoted upward within the openings 33 and the apertures 34 as per arrow P33, as shown in FIGS. 7 and 8. In the process, the frictional engagement of the projections 41 in the apertures 33 in the upper rail 31 is eliminated. The projections 41 still extend through the openings 34 in the upper rail 31 and the apertures 33 in the lower rail 32.

The locking element 4 is adjusted into an intermediate position S3, shown in FIG. 8. This is not a fixed position but is rather an intermediate position S3 of a continuous unlocking movement of the locking element 4, said unlocking movement being controlled by means of the actuating element 9 and being a combined rotating and pulling movement. During the unlocking movement, the locking element 4 is firstly pushed downward within the upper rail 31 in order to exit the blocking region of the blocking element 98. Subsequently, by means of a pulling force, the locking element 4 is pulled past the blocking element 98 and, at least in part, into the upper rail 31.

In the process, and as a result of further actuation of the actuating region 91 into the cavity 5, in particular in the event of further rotation of the actuating element 9 as per arrow P2, the hook-shaped projection 93 moves into the engagement opening 42 until the hook-shaped projection 93 engages around the locking element 4, and, in the event of further actuation, said hook-shaped projection pulls the projections 41 of said locking element entirely out of the apertures 33 in the lower rails 32 as per arrow P32 (as is also illustrated in FIG. 9). The locking element 4, with its in particular tooth-like projections 41, thus disengages from the comb-like or slot-like apertures 33 in the lower rail 32, such that a release position or unlocking position S2 (illustrated in FIG. 9) is made possible, and the upper rail 31 is movable, in particular longitudinally adjustable, relative to the lower rail 32.

FIG. 3 shows the pair of rails 3 in the region of a bracket of the restoring element 11 on the locking element 4. A first end 11.1 (illustrated in FIG. 5) of the restoring element 11 is arranged and held in a receptacle 43 of the locking element 4. In particular, the first end 11.1 engages around the planar part of the locking element 4 through the receptacle 43.

The passage opening 36 in the lower rail 32 for the actuating region 91 of the actuating element 9 is also illustrated in detail. The actuating region 91 is designed as an actuating cam.

A spring 12 is provided for automatically returning the actuating element 9 into a normal position or initial position. The spring 12 is arranged in the region of the actuation axis BA of the actuating element 9. The spring 12 serves for returning the actuating element 9 after an actuation for unlocking the locking element 4.

Figure 4:
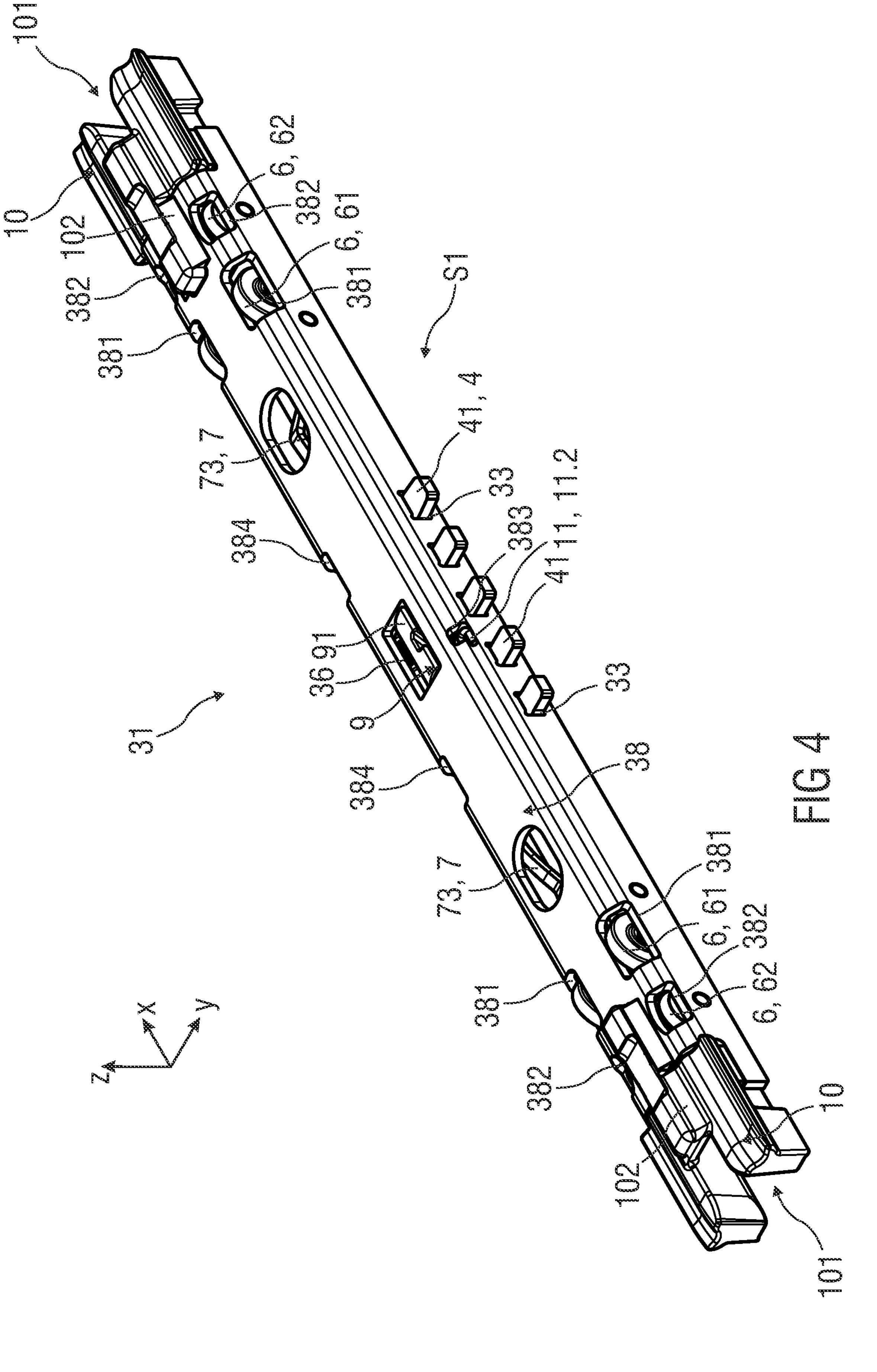
FIG. 4 is a schematic perspective illustration of a top side of an upper rail.

FIG. 4 is a schematic perspective illustration of a top side 38 of the upper rail 31.

The actuating region 91 of the actuating element 9 projects into the passage opening 36. The tooth-like projections 41 of the locking element 4 are in the locking position S1 and project through the apertures 33 in the upper rail 31.

Fastening elements 10 may be provided on the ends of the upper rail 31. The fastening elements 10 may be designed differently depending on the nature of the seat fastening. In the exemplary embodiment shown in FIG. 4, the fastening elements 10 are designed as claw fastenings which each comprise a receiving opening 101 into which claws (not illustrated in any more detail) of the seat 1 engage with holding action. Alternatively, the fastening element 10 may be designed to fasten the seat 1 to the upper rail 31 by means of a screw connection or welded connection 102. Each fastening element 10 is fastened force-fittingly, form-fittingly and/or by a material bond to the upper rail 31. For example, each fastening element 10 is fastened by means of a welded connection 102 to the upper rail 31.

For the spring-preloaded guidance of rollers, the upper rail 31 comprises, on its top side 38, recesses 381 (illustrated in FIG. 4) out of which at least the first roller elements 61 project in order to roll on the lower rail 32, as illustrated in FIGS. 2 and 3. Here, the first roller elements 61 are resiliently preloaded against the upper rail 31 by means of the preload element 7 and are arranged so as to be movable and roll resiliently on a contact surface of the lower rail 32.

Furthermore, the upper rail 31 may, on its top side 38, comprise further recesses 382 into which the second roller elements 62 at least project and run "freely".

Furthermore, in the region of the locking element 4, the upper rail 31 has at least one further recess 383 in which a second end 11.2 of the restoring element 11 is held.

Further recesses 384 serve for receiving the rotary bearing 95 (illustrated in FIG. 5) for the actuating element 9.

FIG. 5 is a schematic perspective illustration of a bottom side 39 of the upper rail 31.

The restoring element 11, in particular a spring such as a wire spring or bow spring, is held by way of the first end 11.1 on the locking element 4 in the receptacle 43.

As shown in this view, the locking element 4 may comprise two engagement openings 42. The actuating element 9 then correspondingly has two hook-shaped projections 93 that engage with said engagement openings 42.

Here, the seat longitudinal-adjustment device 2 comprises two second roller elements 62, which are arranged at respective ends of the upper rail 31. The second roller elements 62, in particular the slide elements for the longitudinal adjustment of the seat 1, are designed for example as roller cylinders or thread spools. The second roller elements 62 have a fixed axle which is fastened to the upper rail 31 and on which the second roller elements 62 rotate.

The seat longitudinal-adjustment device 2 furthermore comprises two preload elements 7 that are arranged in each case between one of the second roller elements 62 and the locking element 4 situated in the middle.

The carrier region 71 of each preload element 7 is of planar and flat form. Each spring region 73 is designed as a bow spring or punched spring or leaf spring.

A pair of first roller elements 61 is mounted rotatably on each preload element 7. For this purpose, each preload element 7 comprises, in the associated bearing region 72, the bearing pins or bearing journals 60, which are illustrated in FIG. 5.

The rotary bearing 95 of the actuating element 9 comprises a fixed axle 96. The rotary bearing 95 is fastened to the inside of the upper rail 31, in particular is welded thereto by means of a weld seam 97. The rotary bearing 95 is designed for example as a rod-like shaped part for bearing and supporting the pivotable actuating element 9.

The rotary bearing 95 may simultaneously form a stop element or the blocking element 98, in particular a horizontal stop or transverse stop, for the locking element 4. Alternatively, the rotary bearing 95 and the blocking element 98 may be formed as separate components. The blocking element 98 is fastened to the inside of the upper rail 31, in particular is connected by a material bond to the upper rail 31 by means of the weld seam 97.

Horizontal movements or transverse movements of the locking element 4, for example owing to mechanical load being applied to the locking element 4, in particular in the event of excitation or vibration in a horizontal direction or transverse direction y (y-axis direction), for example owing to a collision, can be at least limited or entirely blocked by means of the blocking element 98. Here, the blocking element 98 is arranged and designed such that, despite possible undesired horizontal movement or transverse movements, the locking element 4 remains in the locking position S1.

The seat longitudinal-adjustment device 2 is thus blocked, and the seat 1 is fixed in its set longitudinal position. The blocking element 98 is designed for example as a profiled body that extends along the longitudinal direction x. The blocking element 98 is arranged within the upper rail 31 and is fastened, in particular welded, thereto. The blocking element 98 may additionally be designed as a bearing for the actuating element 9.

The blocking element 98 is arranged, within the upper rail 31, parallel to the locking element 4. The blocking element 98 extends in a longitudinal direction x at least over the entire length of the locking element 4. The blocking element 98 may have a greater length than the locking element 4. Along the side directed toward the locking element 4, the blocking element 98 has a correspondingly shaped stop surface 99.

A front projection 41.1 and a rear projection 41.2 of the locking element 4 each have, in the region of contact K with the rails 31, 32, an oblique flank that forms a clamping angle, as will be described in detail below on the basis of FIG. 6. The design with oblique flanks on at least the front projection 41.1 and the rear projection 41.2 means that, in the presence of a relatively high longitudinal load, the locking element 4, in particular a detent plate, is moved perpendicular to the longitudinal orientation of the locking element 4, as per arrow P4, toward the blocking element 98, in particular until said locking element abuts against the stop surface 99.

An arresting function for the locking element 4 in its locking position S1 is made possible by means of the blocking element 98.

By means of a combined rotational movement and pulling movement of the locking element 4 during the unlocking thereof, said arresting function, and thus the blockage of the locking element 4 by the blocking element 98, is circumvented, such that the pair of rails 3 is unblocked and the upper rail 31 is movable, in particular adjustable, relative to the lower rail 32. The locking element 4 can in particular be unlocked only by way of the rotational movement of the actuating element 9, in particular of the unlocking lever. For as long as said actuating element 9 is not actuated, the locking element 4 cannot unlock of its own accord as a result of a longitudinal load or impulse.

In one possible embodiment, the blocking element 98 is designed as a shaped component with the planar stop surface 99.

FIG. 6 shows a schematic enlarged detail of FIG. 5 in a sectional illustration in the region of the locking element 4.

A further simple embodiment for eliminating play between the upper rail 31 and lower rail 32 in the locking position S1 is realized by means of the spring-loaded locking element 4. For this purpose, the spring-loaded locking element 4 has a number of projections 41 which are configured such that, as viewed in a longitudinal direction x (x-axis direction) of the locking element 4, in the locking position S1, the front, in particular the foremost, projection 41.1 makes contact with the lower rail 32 and a rear, in particular the rearmost, projection 41.2 makes contact with the upper rail 31, or vice versa.

By means of such a spring-loaded locking element 4 having a rear projection 41.2 that makes contact with the upper rail 31 in the locking position S1 and a front projection 41.1 that makes contact with the lower rail 32 in the locking position S1, play between the lower rail 32 (also referred to as guide rail) and the upper rail 31 (also referred to as rail runner) can be particularly easily eliminated. The locking element 4 is designed as a horizontal locking means. The upper rail 31 and lower rail 32 are preloaded with respect to one another by means of the spring-loaded locking element 4 in the locking position S1.

In one possible embodiment, the front projection 41.1, in particular a front tooth, has at least one conical region 41.11 in the region of contact K with the lower rail 32. The rear projection 41.2, in particular a rear tooth, has at least one conical region 41.21 in the region of contact K with the upper rail 31. By means of such a conical region 41.11, 41.21 in the region of contact K of the sole contact-making projections 41.1 and 41.2, a form fit and/or force fit is realized between these and the associated rail 32 and 31 respectively. The contact-making projections 41.1 and 41.2 are preferably conical only in the region of contact K. The projections 41.1, 41.2 may additionally have further conical regions 41.11, 41.21 (not illustrated in any more detail).

In the exemplary embodiment shown in FIG. 6, as viewed in a longitudinal direction x, only the two outer projections 41, in particular the foremost or outer front projection 41.1 and the rearmost or outer rear projection 41.2, each have at least one conical region 41.11, 41.21. In particular, the two outer projections 41 each have two mutually oppositely situated conical regions 41.11, 41.21. For example, the outer front projection 41.1 has two mutually oppositely situated conical regions 41.11 that form in each case one of the regions of contact K in the associated aperture 33 in the lower rail 32. For example, the outer rear projection 41.2 has two mutually oppositely situated conical regions 41.21 that form in each case one of the regions of contact K in the associated opening 34 in the upper rail 31.

Further intermediate projections 41.4 arranged between these two outer projections 41, the outer front projection 41.1 and the outer rear projection 41.2, have a straight form or a rectangular form and are configured so as not to make contact with the upper rail 31 or with the lower rail 32.

For example, the locking element 4 may furthermore be braced in the locking position S1 such that the at least one conical region 41.11 of the front projection 41.1 is pressed against the lower rail 32 and the at least one conical region 41.21 of the rear projection 41.2 is pressed against the upper rail 31, or vice versa, such that play between the lower rail 32 and the upper rail 31 is eliminated in the locking position S1. Furthermore, no additional components are required for this elimination of play.

In particular, the locking element 4 is designed, and engages into the upper rail 31 and the lower rail 32, such that play between the upper rail 31 and the lower rail 32 is eliminated in the locking position S1 by means of the preloaded, in particular spring-loaded, locking element 4.

In particular, the front projection 41.1 and the rear projection 41.2 may be of conical form such that, when mechanical load is applied to the seat longitudinal-adjustment device 2, in particular in a longitudinal direction x thereof, the front projection 41.1 engages with clamping or self-locking and load-bearing action into the lower rail 32 and the rear projection 41.2 engages with clamping or self-locking and load-bearing action into the upper rail 31, or vice versa. In particular, the conical regions 41.11 and 41.21, for example wedge-shaped regions, of the front projection 41.1 and of the rear projection 41.2 press against rail recesses, such as the apertures 33 in the lower rail 32 and/or openings 34 in the upper rail 31, in order to generate a clamping force or constraining force and bear load, in particular transfer load to the particular rail, the upper rail 31 and/or the lower rail 32.

In particular, each conical region 41.11, 41.21 has a corresponding wedge angle. To realize a clamping force, a correspondingly large wedge angle, also referred to as clamping angle, is provided in each conical region 41.11, 41.21. To realize a self-locking action, a wedge angle, also referred to as friction angle, is provided which is great enough to prevent a movement or rotation of the particular projection 41 relative to the particular rail 31 and/or 32, and which is in particular less than the clamping angle.

Furthermore, the intermediate projections 41.4 may be designed such that, when mechanical load is applied to the seat longitudinal-adjustment device 2, in particular in a longitudinal direction x, said intermediate projections 41.4 engage only with load-bearing action into the lower rail 32 and/or into the upper rail 31.

Furthermore, the front projection 41.1 and the rear projection 41.2 and the intermediate projections 41.4 may be designed such that, when mechanical load is applied to the seat longitudinal-adjustment device 2, firstly the front projection 41.1 engages with clamping or self-locking and load-bearing action into the lower rail 32 and the rear projection 41.2 engages with clamping or self-locking and load-bearing action into the upper rail 31, or vice versa, and if further mechanical load is applied, the intermediate projections 41.4 additionally engage with load-bearing action into the upper rail 31 and/or into the lower rail 32. Staged bearing of load and dissipation of load are thus made easily possible when mechanical load is applied.

The front projection 41.1 may be the foremost projection or tooth of the locking element 4. The rear projection 41.2 may be the rearmost projection of the locking element 4. The remaining projections 41, in particular those between the front projection 41.1 and the rear projection 41.2, do not make contact in the locking position S1. That is to say, these remaining projections 41 (also referred to as intermediate projections 41.4) make contact neither with the upper rail 31 nor with the lower rail 32. The remaining projections 41 are furthermore designed so as to make contact with the upper rail 31 and with the lower rail 32 only in the presence of relatively high longitudinal loads, in particular in the presence of a collision load, for example in the event of a rear-end collision.

In a further embodiment, at least one of the two contact-making projections, either the front projection 41.1 or the rear projection 41.2, or both, has or have a greater width B in a longitudinal direction x (x-axis direction) than the remaining projections 41.

The conical shape of the front projection 41.1 and of the rear projection 41.2 extends in particular over the respectively associated region of contact K.

Furthermore, all projections 41, including the front projection 41.1 and the rear projection 41.2, have bevels or fillets at their free ends 41.3 so as not to become jammed during locking or unlocking operations and thus during engagement into or disengagement from the openings 34 in the upper rail 31 and the apertures 33 in the lower rail 32.

FIGS. 7 to 9 schematically show a sequence of an unlocking operation of the locking element 4, which will be described in more detail below:

FIG. 7 corresponds to the embodiment according to FIG. 2. Reference is made to the description relating to FIG. 2.

At the start of an unlocking movement of the locking element 4, the actuating element 9 may be mechanically or electromechanically actuated as per arrow P1. Alternatively or in addition, the actuating element 9 may be electromechanically rotated as per arrow P2.

Here, the actuating region 91 is moved toward and actuated into, in particular pushed as per arrow P1 into, the passage opening 36 in the upper rail 31, in order to thus be rotated or pivoted about an actuation axis BA as per arrow P2, such that the control cam 94, which is in engagement with the locking element 4, firstly tilts or rotates the planar locking element 4 downward as per arrow P31. Here, the actuating element 9 is rotated into the cavity 5. Whilst still in the locking position S1, the locking element 4 partially performs the rotational movement or tilting movement as per arrows P31, P33, in particular only a slight rotational movement or tilting movement, as shown in FIGS. 7 and 8.

As a result of further actuation of the actuating region 91, in particular rotation as per arrow P2, into the cavity 5, the hook-shaped projection 93 moves into the engagement opening 42 of the locking element 4 until the hook-shaped projection 93 engages around or behind the locking element 4, as illustrated in FIG. 9.

In the event of further actuation of the actuating element 9, in particular rotation as per arrow P2, the locking element 4, in particular the free ends 41.3 of the projections 41 of said locking element, is/are moved, in particular pulled, entirely out of the apertures 33 in the lower rail 32 as per arrow P32. The locking element 4, with its in particular tooth-like projections 41, thus disengages from the comb-like or slot-like apertures 33 in the lower rail 32, such that the locking element 4 is adjusted into its release position or unlocking position S2, and the upper rail 31 is movable, in particular longitudinally adjustable, relative to the lower rail 32. In this way, a simple bracing and arresting function for the spring-loaded locking element 4 is realized, without additional components, through the utilization of a combined movement consisting of a rotational movement and a pulling movement.

The actuation of the actuating element 9 is performed as a continuous movement, such that the locking element 4 is adjusted from the locking position S1 via the intermediate position S3 into the unlocking position S2 by means of a continuous combined rotational movement and pulling movement.

In addition to the blocking of the locking element 4 in the locking position S1 by means of the blocking element 98, said blocking element may also be designed as a stop element and, for example, be arranged on the upper rail 31 such that the actuating movement of the actuating element 9 into the unlocking position S2 is at least limited or blocked. In particular, said movement of the actuating element 9 into the unlocking position S2 is limited or blocked by means of the blocking element 98 such that the projections 41 of the locking element 4 remain engaged into the openings 34 in the upper rail 31 when said locking element is in its unlocking position S2, as illustrated in FIG. 9. The actuating element 9 abuts against the blocking element 98 in the actuating direction as per arrow P2.

The features disclosed in the above description, in the claims and in the figures may be both individually and collectively of importance for the implementation of the invention in its various configurations, insofar as they remain within the scope of protection of the claims.

LIST OF REFERENCE DESIGNATIONS

1 Seat
1.1 Backrest
2 Seat longitudinal-adjustment device
3 Pair of rails
31 Upper rail
32 Lower rail
33 Aperture
34 Opening
35 Free end
36 Passage opening
37 Leg region
38 Top side of the upper rail
381 to 384 Recess
39 Bottom side of the upper rail
4 Locking element
41 Projection
41.1 Front projection
41.11 Conical region
41.2 Rear projection
41.21 Conical region
41.3 Free end
41.4 Intermediate projection
42 Engagement opening
43 Receptacle
5 Cavity
6 Roller element
60 Bearing journal
61 First roller element
62 Second roller element
7 Preload element
71 Carrier region
72 Bearing region
73 Spring region
8 Fastening bolt
9 Actuating element
91 Actuating region
92 Coupling region
93 Hook-shaped projection
94 Control cam
95 Rotary bearing
96 Axis 97 Weld seam
98 Blocking element
99 Stop surface
10 Fastening element
101 Receiving opening
102 Welded connection
11 Restoring element
11.1 First end
11.2 Second end
12 Spring
B Width
BA Actuation axis
K Region of contact
P1, P2, P31, P32, P33, P4 Arrow
S1 Locking position
S2 Unlocking position
S3 Intermediate position
x x-axis direction, longitudinal direction
y y-axis direction, transverse direction
z z-axis direction, vertical direction

The invention claimed is:

1. A seat longitudinal-adjustment device, comprising:
a pair of rails,
at least one locking element, and
at least one blocking element,
wherein the pair of rails is formed from an upper rail and a lower rail that are movable relative to one another,
wherein the at least one locking element is arranged movably on the upper rail and, in a locking position, blocks a movement of the upper rail in the lower rail and, in an unlocking position, allows the movement of the upper rail in the lower rail,
wherein the at least one locking element has a number of projections that are designed such that, as viewed in a longitudinal direction of the at least one locking element, in the locking position, a front projection of the number of projections makes contact with the lower rail, a rear projection of the number of projections makes contact with the upper rail, and at least one or more intermediate projections of the number of projections arranged between the front projection and the rear projection have a straight form or a rectangular form and are configured so as not to make contact with the upper rail or with the lower rail during a normal operation,
wherein the at least one locking element is arranged and configured such that, during an unlocking operation, the at least one locking element is firstly partially rotatable in the locking position and is subsequently pullable into the unlocking position,
wherein the at least one blocking element is a profiled body fixed to an inner side of the upper rail and spaced from the at least one locking element,
wherein the profiled body has a stop surface facing the at least one locking element, and
wherein, in the locking position, the stop surface is positioned to limit a transverse movement of the at least one locking element under a longitudinal load via an abutment of the at least one locking element against the stop surface.

2. The seat longitudinal-adjustment device as claimed in claim 1, wherein the at least one locking element is braced in the locking position such that the front projection is pressed against the lower rail and the rear projection is pressed against the upper rail, such that play between the lower rail and the upper rail is eliminated in the locking position.

3. The seat longitudinal-adjustment device as claimed in claim 1, wherein when a mechanical load is applied to the seat longitudinal-adjustment device, the front projection engages with a clamping and load-bearing action into the lower rail and the rear projection engages with a clamping and load-bearing action into the upper rail.

4. The seat longitudinal-adjustment device as claimed in claim 1, wherein intermediate projections of the at least one or more intermediate projections are designed such that, when a mechanical load is applied to the seat longitudinal-adjustment device, the intermediate projections of the at least one or more intermediate projections engage with a load-bearing action into the lower rail and/or into the upper rail.

5. The seat longitudinal-adjustment device as claimed in claim 1, wherein, in the locking position, only the front projection makes contact in the longitudinal direction with the lower rail during the normal operation and only the rear projection makes contact in the longitudinal direction with the upper rail during the normal operation.

6. The seat longitudinal-adjustment device as claimed in claim 5, wherein, in the locking position, intermediate projections of the at least one or more intermediate projections between the front projection and the rear projection are not in contact in the longitudinal direction with the upper rail or with the lower rail during the normal operation.

7. The seat longitudinal-adjustment device as claimed in claim 1, wherein the at least one locking element is arranged in a spring-loaded fashion, and movably, on the upper rail.

8. The seat longitudinal-adjustment device as claimed in claim 1, wherein the at least one locking element is movable from the locking position into the unlocking position by a combined rotating and pulling movement.

9. The seat longitudinal-adjustment device as claimed in claim 1, wherein the seat longitudinal-adjustment device further comprises a preload element disposed in a cavity between the upper rail and the lower rail, wherein the preload element biases the upper rail relative to the lower rail during a longitudinal adjustment, wherein the preload element comprises a carrier region, wherein the carrier region has a spring region and a bearing region, wherein the spring region is configured to exert a preload force against the upper rail, and wherein the bearing region is configured to receive at least one roller element.

10. A vehicle seat having a seat longitudinal-adjustment device as claimed in claim 1.

11. A seat longitudinal-adjustment device, comprising:
a pair of rails,
at least one locking element, and
an actuating element configured to unlock the at least one locking element, wherein the actuating element is pivotally mounted in an interior space formed by the pair of rails and engages at least one contact surface of the at least one locking element,
wherein the pair of rails is formed from an upper rail and a lower rail that are movable relative to one another,
wherein the at least one locking element is arranged movably on the upper rail and, in a locking position, blocks a movement of the upper rail in the lower rail and, in an unlocking position, allows the movement of the upper rail in the lower rail,
wherein the at least one locking element has a number of projections that are designed such that, as viewed in a longitudinal direction of the at least one locking element, in the locking position, a front projection of the number of projections makes contact with the lower rail, a rear projection of the number of projections makes contact with the upper rail, and at least one or more intermediate projections of the number of projections arranged between the front projection and the rear projection have a straight form or a rectangular form and are configured so as not to make contact with the upper rail or with the lower rail during a normal operation, wherein the interior space is accessible through an aperture in the upper rail, wherein an actuating region of the actuating element is accessible through the aperture in the upper rail, wherein the actuating region is connected to a coupling region of the actuating element and the coupling region engages the at least one locking element, wherein a rotary bearing of the actuating element is arranged within the interior space and on the upper rail to rotatably support the actuating element, wherein the rotary bearing comprises a fixed axle defining a rotational axis of the actuating element, and wherein the at least one locking element is arranged and configured such that, during an unlocking operation, the at least one locking element is firstly partially rotatable in the locking position and is subsequently pullable into the unlocking position.

12. The seat longitudinal-adjustment device as claimed in claim 11, wherein the coupling region comprises a control cam configured to rotate the at least one locking element.

13. The seat longitudinal-adjustment device as claimed in claim 12, wherein the coupling region comprises a hook-shaped projection configured to pull the at least one locking element into the unlocking position.

* * * * *